US008534673B2

(12) United States Patent
Scimeca et al.

(10) Patent No.: US 8,534,673 B2
(45) Date of Patent: Sep. 17, 2013

(54) INTER STAGE SEAL HOUSING HAVING A REPLACEABLE WEAR STRIP

(75) Inventors: Santo F. Scimeca, Oviedo, FL (US); Chad Garner, Orlando, FL (US)

(73) Assignee: Mitsubishi Power Systems Americas, Inc., Lake Mary, FL (US)

( * ) Notice: Subject to any disclaimer, the term of this patent is extended or adjusted under 35 U.S.C. 154(b) by 361 days.

(21) Appl. No.: 12/860,359

(22) Filed: Aug. 20, 2010

(65) Prior Publication Data

US 2012/0043724 A1 Feb. 23, 2012

(51) Int. Cl.
*F16J 15/447* (2006.01)

(52) U.S. Cl.
USPC .......................................... 277/416; 277/631

(58) Field of Classification Search
USPC ................................. 277/411-412, 416, 631
See application file for complete search history.

(56) References Cited

U.S. PATENT DOCUMENTS 3,046,648 A 7/1962 Kelly
3,647,311 A 3/1972 Wootton et al.
4,650,397 A 3/1987 Rogo
5,080,556 A 1/1992 Carreno
5,090,710 A * 2/1992 Flower .......................... 277/355
5,338,154 A 8/1994 Meade et al.
5,474,305 A * 12/1995 Flower .......................... 277/355
5,501,573 A 3/1996 Sanders
5,749,701 A 5/1998 Clarke et al.
6,082,740 A * 7/2000 Jones et al. .................... 277/578
6,161,839 A * 12/2000 Walton et al. ................. 277/590
6,220,815 B1 4/2001 Rainous et al.
6,226,975 B1 5/2001 Ingistov
6,283,712 B1 * 9/2001 Dziech et al. ................. 416/179
6,422,815 B1 7/2002 Marler et al.
6,622,490 B2 9/2003 Ingistov
6,679,500 B1 1/2004 Maurer et al.
6,679,678 B2 1/2004 Giesler et al.
7,000,923 B2 * 2/2006 Addis ........................... 277/355
7,909,334 B2 * 3/2011 Beichl et al. .................. 277/355
2002/0130469 A1 * 9/2002 Kono ............................ 277/355
2004/0000761 A1 * 1/2004 Addis ........................... 277/355
2004/0150164 A1 8/2004 Morgan
2008/0159850 A1 7/2008 Tholen et al.

OTHER PUBLICATIONS

Notification of Transmittal of International Search Report and the Written Opinion of the International Searching Authority , or the Declaration(form PCT/ISA/220) of PCT/US2011/048255, date of mailing Jan. 13, 2012 with Forms PCT/ISA/210 and PCT/ISA/237.

* cited by examiner

*Primary Examiner* — Vishal Patel
(74) *Attorney, Agent, or Firm* — Westerman, Hattori, Daniels & Adrian, LLP

(57) ABSTRACT

An inter stage seal housing for a turbine engine having upper and lower half inter stage seal housings in which a contact sealing surface of the seal housing is restored after an interval of engine operation. The contact sealing surface is restored by fitting a replaceable wear strip on the downstream sealing surface of the seal housing. In order to fit the replaceable wear strip, a circumferential groove is machined along an outer peripheral edge of the seal housing. The groove is machined to include axial location and radial retention such that the wear strips can be slid into the upper half and lower half inter stage seal housing circumferentially from the horizontal joint. The groove includes through holes and the wear strips include corresponding threaded holes such that the wear strips can be fastened in the groove by fasteners and fastener retention hardware.

25 Claims, 7 Drawing Sheets

"Prior Art"

"Prior Art"

INTER STAGE SEAL HOUSING HAVING A REPLACEABLE WEAR STRIP

FIELD OF THE INVENTION

This invention relates to using a replaceable wear strip in an inter stage seal housing for a turbine engine, and more particularly, but not by way of limitation, to using the replaceable wear strip to restore a downstream sealing surface of the inter stage seal housing for the turbine engine after prolonged engine usage.

BACKGROUND OF THE INVENTION

An inter stage seal housing is used in a turbine engine to form a seal between itself, a rotating component, and another non-rotating component of the turbine engine, such as the turbine stator or a stationary vane component. FIG. 1 shows an enlarged cross-sectional view of a conventional inter stage seal housing 10, which includes a downstream contact sealing surface 13. FIG. 2 shows an enlarged fragmentary cross-sectional view of the conventional inter stage seal housing 10 shown in FIG. 1 together with a stationary airfoil 14. As shown in FIG. 2, the downstream contact sealing surface 13 of the conventional inter stage seal assembly 10 prevents the flow 15 from passing between the inter stage seal housing 10 and a stationary airfoil 14 of the turbine. However, engine operation eventually causes the downstream contact sealing surface 13 of the inter stage seal housing 10 to wear with the amount of wear being proportional to the number of hours of engine operation. Excessive wear of the downstream contact sealing surface 13 can create a leak path, which can negatively affect the cooling efficiency of the associated rotor disc cavity, vane inner shrouds and overall engine efficiency and performance of the turbine engine.

During a schedule maintenance for the turbine, the downstream contact sealing surface 13 of the inter stage seal housing 10 is examined for excess wear and possible leaks. If excess wear and/or any leaks are found, the downstream contact sealing surface 13 of inter stage seal housing 10 must be welded in order to restore the downstream contact sealing surface 13 to its original shape. However, this type of weld building repair tends to be very time consuming, which leads to increase service expenses, and the downstream contact sealing surface 13 becomes distorted as a result of the weld buildup, which imparts on the performance of the turbine engine.

SUMMARY OF THE INVENTION

In view of the above stated problems, it is one aspect of the present invention to provide a seal assembly with replaceable wear strips as the downstream contact sealing surface of an inter stage seal housing, which can be replaced during maintenance in order to restore the downstream contact sealing surface of the inter stage seal housing to its original shape. The seal assembly for a turbine engine, comprising a seal housing having a circumferential groove located along an edge of the seal housing, the circumferential groove having a plurality of through holes, at least one replaceable segment strip, each having at least one threaded hole, an upstream sealing surface, a downstream sealing surface, a right circumferential sealing surface and a left circumferential sealing surface, and a plurality of fasteners for securing segment strips in the circumferential groove, the circumferential groove being configured to accept the geometry of the strip (s).

The seal housing further comprises a downstream surface, wherein the downstream sealing surface of the secured segment strips forms a substantially planar surface with the downstream surface of the seal housing and serves as a replaceable contact surface strip for the seal housing, and an upstream surface, wherein the plurality of through holes extend from the upstream surface to the circumferential groove.

In accordance with another aspect of the present invention, the upstream sealing surface of the secured segment strip forms an upstream contact sealing surface with the seal housing, the downstream sealing surface of the secured segment strip forms a downstream contact sealing surface with a stationary member of the turbine engine, the right circumferential sealing surface of the secured segment strip forms a first circumferential contact sealing surface with another left circumferential sealing surface of an adjacently secured sealing segment, and the left circumferential sealing surface of the secured segment strip forms a second circumferential contact sealing surface with another right circumferential sealing surface of another adjacently secured sealing segment, wherein the first and second circumferential contact sealing surfaces are configured to prevent leakage between adjacently secured segment strips with the first and second circumferential contact sealing surface having a step portion.

According to another aspect of the present invention, the plurality of fasteners comprises a first fastener for securing the segment strip to the circumferential groove by engaging a first threaded hole of the segment strip via a first through hole of circumferential groove, at least one additional fastener for securing the segment strip to the circumferential groove by engaging at least one additional threaded hole of the segment strip via at least one additional through hole of circumferential groove, wherein the second fastener has a reduced diameter portion relative to the first fastener, which creates a larger clearance between the second fastener and the second through hole than between the first fastener and the first through hole. The fasteners provide additional clamping force between the seal housing and the secured segment strip, and the larger clearance between the second fastener and the second through hole allows for thermal expansion of the seal housing during operation of the turbine engine, wherein the fasteners prevent unwanted relative movement and wear between the seal housing and the secured segment strip and fastener retention means is for minimizing disbanding of the fasteners during turbine engine operation.

According to another exemplary embodiment of the present invention the seal housing includes an upper half seal housing; a lower half seal housing and a horizontal split formed between said upper and lower half seal housing, and the circumferential groove includes a radial retention mechanism for retaining the secured segment strips in a radial direction and an axial locating mechanism for positioning the secured segment strips in a axial direction.

According to another aspect of the present invention each segment strip is slid into the groove from the horizontal split of the upper and the lower seal housing and the threaded holes of each segment strip are aligned with corresponding through holes of the grooves where fasteners and fastener retention components are threaded and torque is applied.

It is another aspect of the present invention to provide a seal assembly for a turbine engine, comprising a seal housing having a circumferential groove located along an edge of said seal housing; at least one segment strip, each having an upstream sealing surface, a downstream sealing surface, a right circumferential sealing surface and a left circumferential sealing surface, wherein said circumferential groove is configured to accept the geometry of the said at least one segment strip, wherein said at least one segment strip does not include any threaded holes, and wherein said seal housing does not include any through holes.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE PREFERRED EMBODIMENTS

First Embodiment

In the following, a first embodiment of the present invention is described with reference to FIGS. 3-8.

Figure 1:
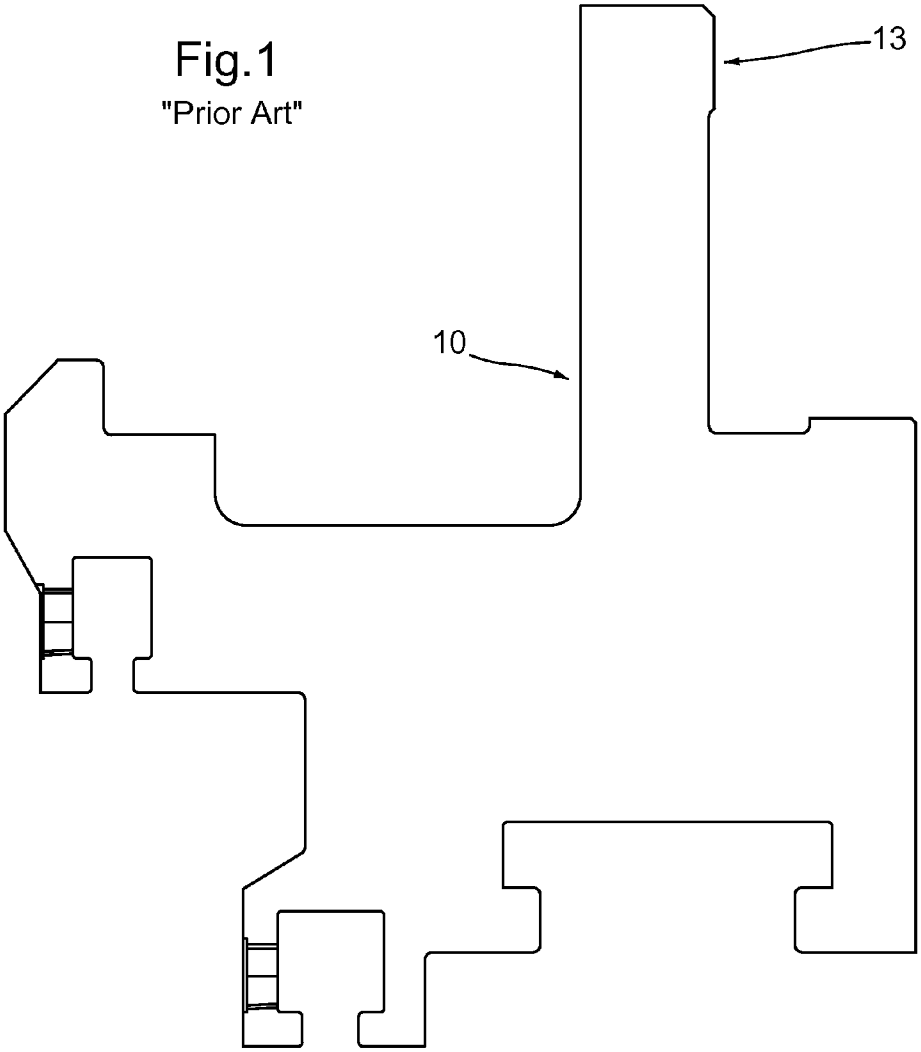
FIG. 1 is an enlarged cross-sectional view of a conventional inter stage seal housing.
Figure 2:
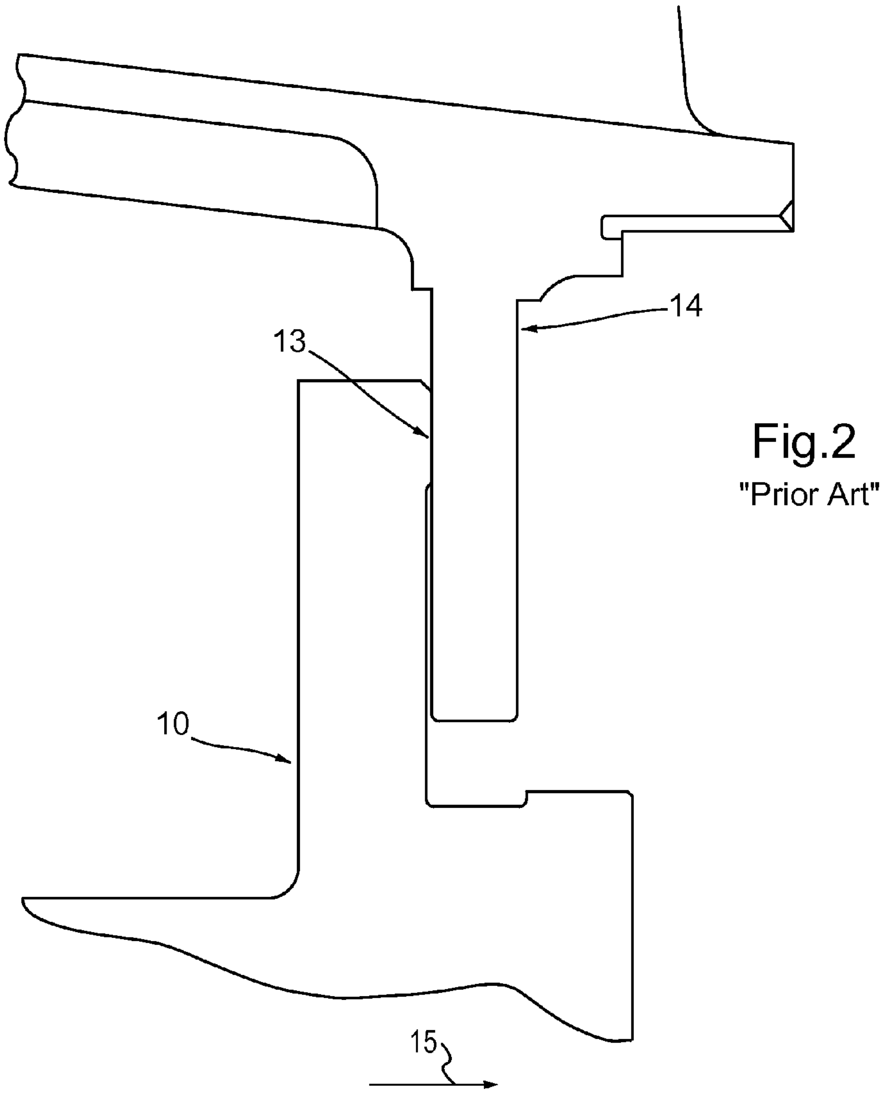
FIG. 2 is an enlarged fragmentary cross-sectional view of the conventional inter stage seal housing and a stationary airfoil.
Figure 3:
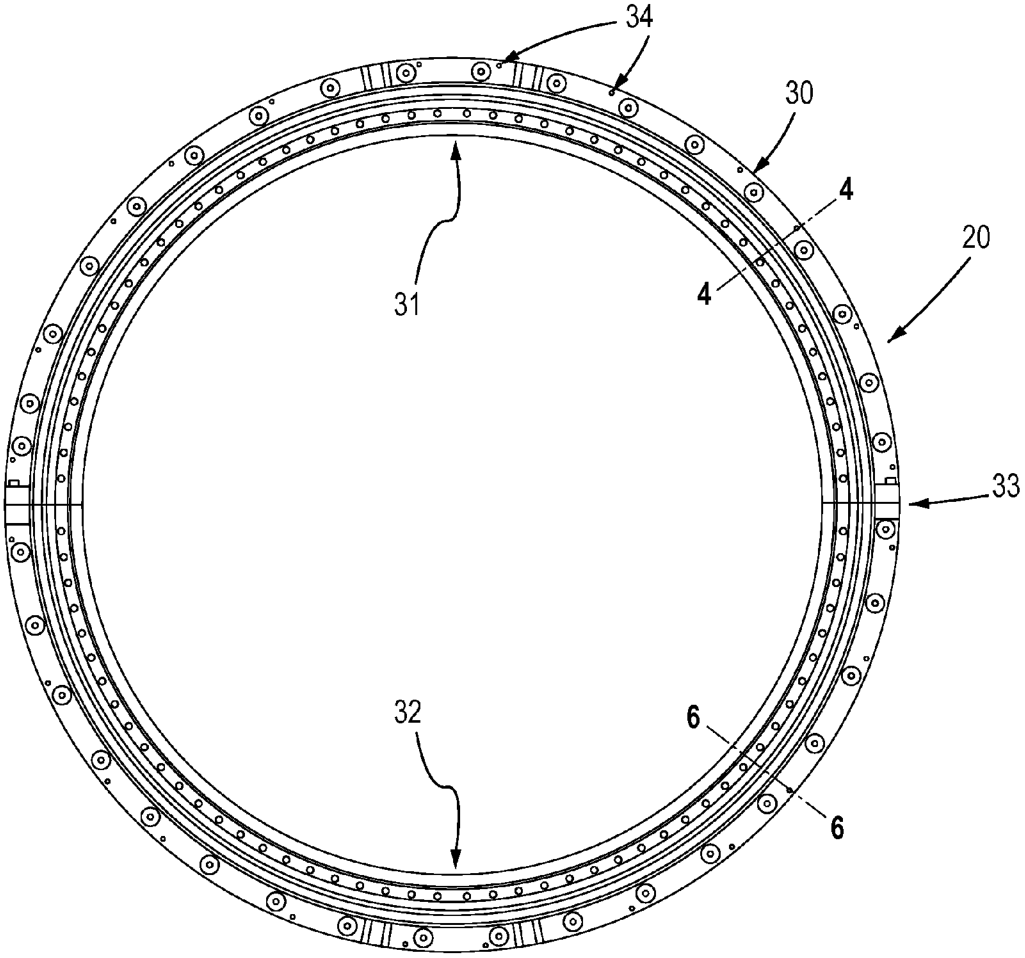
FIG. 3 is an elevational view of an inter stage seal housing in accordance with a first exemplary embodiment of the present invention.

FIG. 3 is an elevational view of a sealing assembly 20 that includes an inter stage seal housing 30 which prevents the flow 42 from passing between the seal housing 30 and another non-rotating component of a turbine, such as the turbine stator (not shown) or stationary vane component (not shown) in accordance with the first exemplary embodiment of the invention. Note that the seal housing 30 may be used in all types of turbine engines, including gas turbine engines, steam turbine engines, aircraft engines, and others. As shown in FIG. 3, the seal housing 30 may be configured with an upper half inter stage seal housing 31 and a lower half inter stage seal housing 32 having a horizontal split 33 located between the upper and lower half seal housings 31, 32. The upper and lower seal housings 31, 32 each include a plurality of through holes 34.

Figure 4:
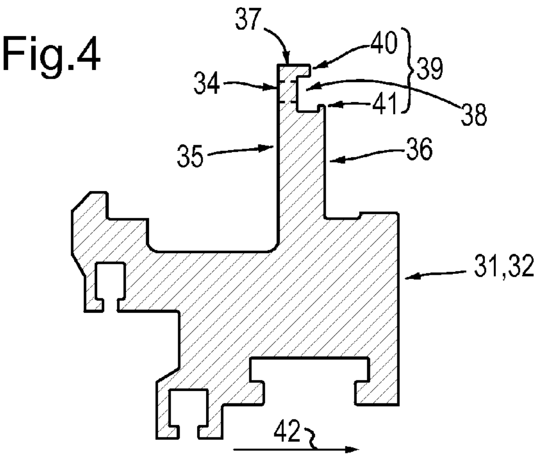
FIG. 4 is an enlarged cross-sectional view of the inter stage seal housing taken along line 4-4 of FIG. 3 without a replaceable wear strip installed in accordance with the first exemplary embodiment of the present invention.

FIG. 4 is an enlarged cross-sectional view of either the upper or lower seal housings 31, 32 of the inter stage seal housing 30 taken along line 4-4 of FIG. 3. As shown in FIG. 4, the seal housings 31, 32 each include an upstream surface 35, a downstream surface 36 and an outer edge surface 37. However, according to the first exemplary embodiment of the invention, a feature 38, (e.g., a groove or a channel), is machined along an entire circumference along an outer portion of the downstream surface 36 and along a downstream portion of the outer edge surface 37 of the seal housings 31, 32. As such, the seal housings 31, 32 do not include a downstream contact sealing surface near the outer edge surface 37 for preventing the flow 42 from passing between the seal housings 31, 32 and another stationary component of the turbine. However, the feature 38 can be machined to have a specific retention geometry 39, which includes an axial locating flange 41 and a radial retention flange 40 for accepting the geometry of a replaceable wear segment strip 50 shown in FIG. 5, which serves as a replaceable downstream contact sealing surface strip for the seal housing 30 shown in FIG. 3. In addition, the through holes 34, shown by dashed lines, are formed by machining a hole from the upstream surface 35 into the feature 38. As a result, the through holes 34 are positioned inside the feature 38.

Figure 5:
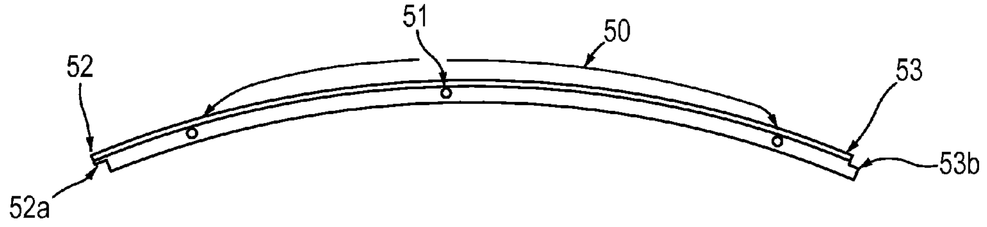
FIG. 5 is an elevational view of a replaceable wear strip in accordance with the first exemplary embodiment of the invention.

FIG. 5 is an elevational view of the replaceable wear segment strip 50, which includes a plurality of threaded holes 51 and right and left circumferential sealing surfaces 52 and 53, respectively. Further, the right and left surfaces 52, 53 of the segment strips each include respective machined step portions 52A and 53A as sealing surfaces.

Figure 6:
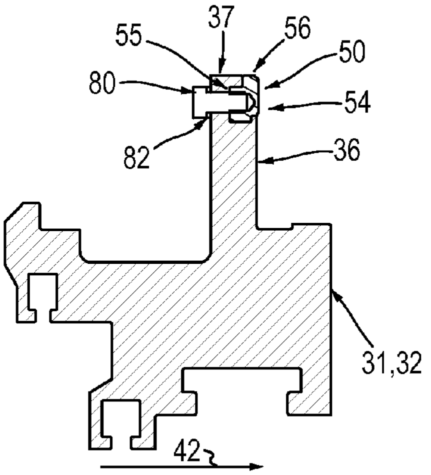
FIG. 6 is an enlarged cross-sectional view of an inter stage seal housing taken along line 6-6 of FIG. 3, which shows a replaceable wear segment strip secured in the inter stage seal housing in accordance with the first exemplary embodiment of the invention.

FIG. 6 is an enlarged cross-sectional view of either the upper or lower seal housings 31, 32 of the inter stage seal housing 30 taken along line 6-6 of FIG. 3 showing a segment strip 50 that is fitted into the feature 38 of the seal housings 31, 32 in order to provide the seal housings 31, 32 with a downstream sealing surface 54 in accordance with the first exemplary embodiment of the invention. Specifically, the threaded holes 51 of the segment strip 50 are aligned with corresponding through holes 34 of the seal housings 31, 32 when the segment strip 50 is installed in the feature 38. As shown in FIGS. 5 and 6, the segment strip 50 has a geometry which matches the specific retention geometry 39 of the feature 38.

Accordingly, after the segment strip 50 is installed in the feature 38, the segment strip 50 is able to restore the shape of the downstream portion of the outer edge surface 37 and the outer portion of the downstream surface 36, which were machined away by forming the feature 38. Specifically, as shown in FIG. 6, the downstream sealing surface 54 of the segment strip 50 forms a first planar surface with the downstream surface 36 of the seal housings 31, 32. The segment strip 50 also includes an outer edge surface 56, which forms a second planar surface with the outer edge surface 37 of the seal housings 31, 32, with the first and second planar surface being substantially perpendicular to each other.

In other words, the segment strip 50 is able to restore the seal housings 31, 32 to their original geometry, but since the segment strip 50 is replaceable, once the downstream sealing surface 54 of the segment strip 50 begins to show wear, a new segment strip 50 having a new downstream sealing surface 54 can be easily installed in the feature 38, without the need for any welding to the downstream sealing surface 54.

Referring again to FIGS. 5 and 6, the segment strip 50 includes four sealing surfaces; the downstream sealing surface 54, an upstream sealing surface 55, and the right and left circumferential sealing surfaces 52A and 53A. The downstream sealing surface 54 forms a downstream contact sealing surface with an upstream surface of a stationary component, e.g., the stator or vane member (not shown), of a turbine. The upstream sealing surface 55 forms an upstream contact sealing surface with the seal housings 31, 32. Left and right circumferential sealing contact surfaces are formed between the adjacently installed segment strips. It is also understood that while typically two to ten segment strips 50 are installed into the seal housing 30, it is possible to install a single segment strip 50 in which the right and left circumferential sealing surfaces 52 and 53 of the single segment strip 50 would form a circumferential sealing contact surface with each other.

Figure 7:
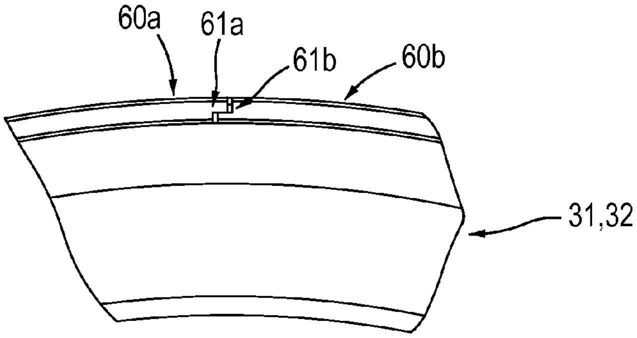
FIG. 7 is an enlarged fragmentary elevational plan view showing the configuration of circumferential sealing surfaces between two adjacent wear segment strips secured in the inter stage seal housing.

More specifically, FIG. 7 is an enlarged fragmentary elevational view showing two segment strips 60A and 60B installed adjacently in the feature 38 in the seal housings 31, 32. As shown in FIG. 7, the circumferential sealing surface 52A for segment strip 60A forms a circumferential sealing contact surface 61A with the circumferential surface 53A for segment strip 60B. Further, the circumferential sealing surfaces 52A, 53A of the segment strips 60A, 60B, respectively, are configured to prevent leakage between the segment strips 60A, 60B. That is, the right and left sealing surfaces 52A, 53A of the segment strips 60A, 60B, respectively, include respective machined step portions 52 and 53. Further, while the step portions 52 and 53 are configured to prevent leakage between the segment strips 60A, 60B, the step portions 52 and 53 are also configured to allow thermal expansion during turbine engine use between the right and left circumferential clearance surfaces 52, 53.

Further, it is understood that in addition to the step portions, other geometric configurations can be used between the right and left circumferential sealing surfaces 53A, 52A to achieve the same benefits.

Figure 8A:
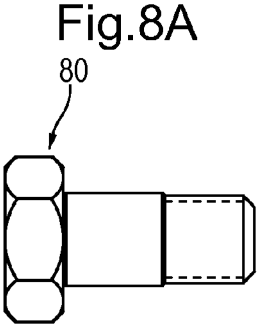
FIGS. 8A-8C are elevational views of fastener equipment used to secure a replaceable wear segment strip to an inter stage seal housing in accordance with the first exemplary embodiment of the invention.
Figure 8B:
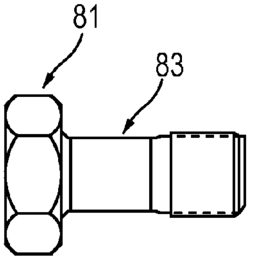
Figure 8C:
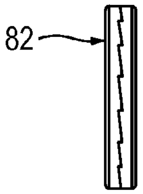
Figure 9:
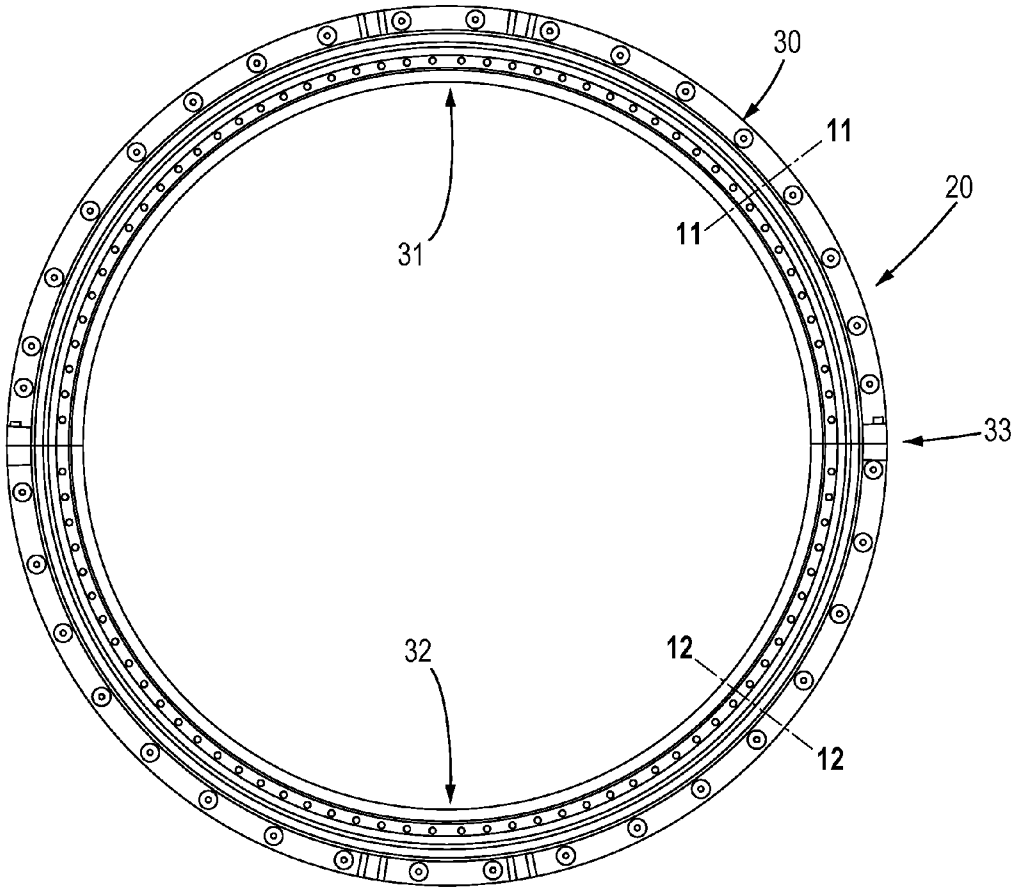
FIG. 9 is an elevational view of an inter stage seal housing in accordance with a second exemplary embodiment of the present invention.
Figure 10:
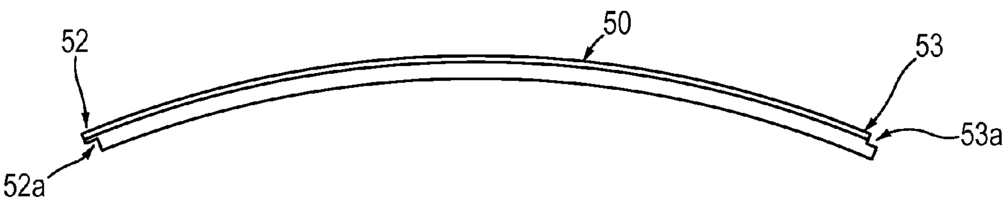
FIG. 10 is an elevational view of a replaceable wear strip in accordance with the second exemplary embodiment of the invention.
Figure 11:
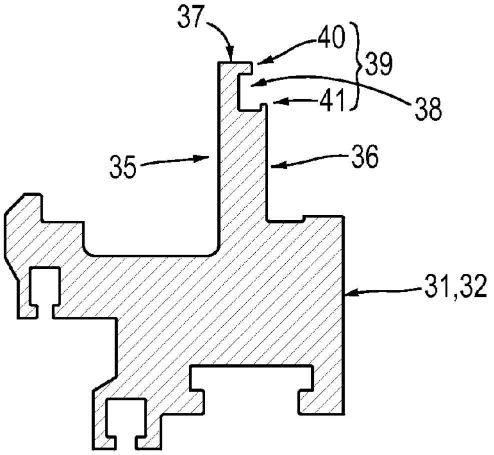
FIG. 11 is an enlarged cross-sectional view of the inter stage seal housing taken along line 11-11 of FIG. 9 without a replaceable wear strip installed in accordance with the second exemplary embodiment of the invention.
Figure 12:
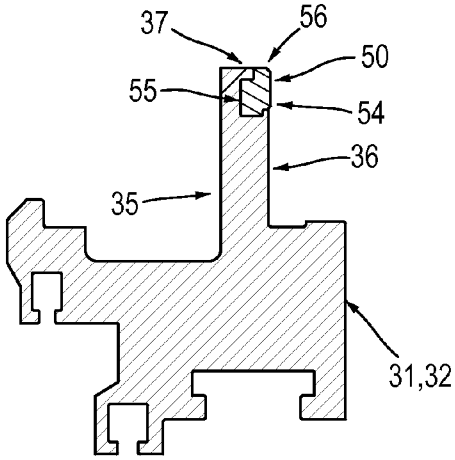
FIG. 12 is an enlarged cross-sectional view of an inter stage seal housing taken along line 12-12 of FIG. 9, which shows a replaceable wear segment strip secured in the inter stage seal housing in accordance with the second exemplary embodiment of the invention.

FIGS. 8A-8C show an elevational view of fastener equipment used to secure the replaceable segment strips 50 to the seal housings 31, 32 in accordance with the first exemplary embodiment of the invention. As shown in FIGS. 8A and 8B, different types of fastening hardware, for example, a shoulder bolt 80 and a captive bolt 81, respectively, can be used with fastener retention hardware, for example, a Nordlock washer 82 shown in FIG. 8C, to fasten or secure the segment strips 50 to the seal housings 31, 32, as shown in FIG. 6. The fastening hardware secures, locates and prevents unwanted relative movement and wear between the seal housings 31, 32 and the segment strips 50. The fastener retention hardware minimizes the disbanding of the fasteners during engine operation. In other words, the fastening hardware, e.g., shoulder bolt 80 and captive bolt 81 engage the threaded holes 51 of the segment strips 50 via the through holes 34 of the seal housings 31, 32, and provide for circumferential locating and securing of the segment strips 50 to the seal housings 31, 32.

As also shown in FIGS. 8A and 8B, the captive bolt 81 includes a reduced diameter portion 83, which is not provided in the shoulder bolt 80. Therefore, when a captive bolt 81 is used to engage a threaded hole 51 via a through hole 34, a clearance is formed between the reduced diameter portion 83 of the captive bolt 81 and the through hole 34. That is, the captive bolts 81 are designed to have the reduced diameter 83, which provides the clearance, which allows for thermal expansion of the seal housings 31, 32 and the segment strips 50 during turbine operation while still maintaining at least the minimum desired clamping force between the segment strips 50 and the seal housings 31, 32. The shoulder bolt 80 does not have a reduced clearance portion and is therefore able to provide additional clamping force between the segment strips 50 and the seal housings 31 and 32 than the captive bolt 81. All fastening hardware are secured to the seal housings 31, 32 by the use of the fastener retention hardware, or fastener means, which includes but is not limited to wedge lock washers, such as the nordlock washer shown in FIG. 8C, star washers, tabbed washers or by welding. As shown in FIG. 6, a shoulder bolt 80 and a nordlock washer 82 are used to secure the segment strip 50 the seal housings, 31, 32.

Accordingly, during maintenance for a turbine engine, after the existing segments strips 50 are removed from the feature 38 of the seal housings 31, 32, new segments strips 50 are provided in the feature 38, which restores the downstream sealing surface 54 of the seal housings 31, 32. More specifically, the feature 38 is designed such that the segment strips 50 are slid into the upper and the lower seal housings 31, 32 circumferentially from the horizontal split 33. Since the feature 38 is machined to have a specific retention geometry 39 for accepting the geometry of the replaceable segment strip 50, which includes a radial locating flange 40 and an axial retention flange 41, the feature 38 locates the segment strips 50 both axially and radially to the seal housings 31, 32 during installation. The threaded holes 51 of each segment strip 50 are then aligned with corresponding through holes 34 of the feature 38 and shoulder bolts 80 and captive bolts 81 along with fastener retention means are used to fasten the segment strips 50, after which torque is applied to the bolts 80, 81. In other words, the machined feature 38 provides retention of the segment strips 50 during assembly resulting in easy installation.

For example, for the segment strip 50, shown in FIG. 5, which has three threaded holes 51, two captive bolts 81 are used to secure the two outer most threaded holes 51 and a shoulder bolt 80 is used to secure the threaded hole 51 located in the middle of the segment strip 50. Specifically, using the shoulder bolt 80 in the center of the segment strip 50 provides retention, i.e., additional clamping force, and assists is locating each segment strip 50 circumferentially. As discussed above, the captive bolts 81 have a reduced diameter 83, which allows for thermal expansion of the seal housings 31, 32 and the segment strips 50 while still maintaining at least the minimum desired clamping force between the segment strips 50 and the seal housings 31, 32. Moreover, using the captive bolts 81 on the outer most threaded holes 51 provides additional flexibility by allowing thermal expansion from the center of the segment strip 50 to the outer portions. Further, it is also understood that the number of threaded holes 51 provided in the segment strips 50 is not limited to three and may include one single threaded hole or no threaded holes.

Second Embodiment

Next, a second embodiment of the present invention is described with reference to FIGS. 9-12.

The second embodiment is different from the aforementioned first embodiment in that the replaceable wear segment strip 50 does not include any threaded holes 51 and the upper and lower seal housings 31, 32 do not include any through holes 34 for aligning the threaded holes 51 of the segment strip 50 when the segment strip 50 is installed in the feature 38. Further, no fastening hardware or fastener retention hardware is used to fasten or secure the segment strips 50 to the seal housings 31, 32. The remaining points are similar to those of the first embodiment so that their descriptions are omitted.

As a result, in the second embodiment, since the replaceable wear segment strip 50 does not include any threaded holes 51, the specific retention geometry 39 of the feature 38, which includes the radial locating flange 40 and the axial retention flange 41, is the only mechanism used to retain and secure the installed segment strips 50 in the feature 38.

As a result, the need to form the threaded holes 51 and through holes 34 on the segment strip 50, and the upper and lower seal housing 31, 32, respectively, is eliminated. Also eliminated is the need for aligning the through holes 34 with the threaded holes 51 during installation of the segment strip (s) 50 in the feature 38.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A seal assembly for a turbine engine, comprising:

a seal housing having a circumferential groove located along an edge of said seal housing, said circumferential groove having a plurality of through holes;

a plurality of segments strips, each having at least one threaded hole, an upstream sealing surface, a downstream sealing surface, a right circumferential sealing surface and a left circumferential sealing surface, and a plurality of fasteners for securing each of said plurality of segments strips in said circumferential groove in an annular manner to form a seal, wherein said circumferential groove is configured to accept the geometry of each of said plurality of secured segments strips, said upstream sealing surface of each of said plurality of secured segment strips forms an upstream contact sealing surface with said seal housing, said downstream sealing surface of each of said plurality of secured segment strips is arranged to form a downstream contact sealing surface with a stationary member of said turbine engine, said right circumferential sealing surface of a first of said plurality of secured segment strips forms a first circumferential contact sealing surface with a left circumferential sealing surface of a second of said plurality of secured segment strips, and said left circumferential sealing surface of said first of said plurality of secured segment strips forms a second circumferential contact sealing surface with a right circumferential sealing surface of the second of said plurality of secured segment strips.

2. The seal assembly according to claim 1, wherein said seal housing further comprises:

a downstream surface;

wherein said downstream sealing surface of each of said plurality of secured segment strips forms a substantially planar surface with said downstream surface of said seal housing and serves as a replaceable contact surface strip for said seal housing.

3. The seal assembly according to claim 1, wherein said seal housing further comprises:

an upstream surface;

wherein each of said plurality of through holes extend from said upstream surface to said circumferential groove.

4. The seal assembly of claim 1, wherein said first and second circumferential contact sealing surfaces are configured to prevent leakage between said first and second secured segment strips.

5. The seal assembly of claim 4, wherein said first circumferential contact sealing surface includes a step portion.

6. The seal assembly according to claim 1, wherein said plurality of fasteners prevent unwanted relative movement and wear between said seal housing and each of said plurality of secured segment strips.

7. The seal assembly according to claim 1, further comprising:

fastener retention means for minimizing disbanding of the fasteners during turbine engine operation.

8. The seal assembly according to claim 1, wherein said circumferential groove includes a radial retention mechanism for retaining each of said plurality of secured segment strips in a radial direction.

9. The seal assembly of claim 8, wherein said circumferential groove includes an axial locating mechanism for positioning each of said plurality of secured segment strips in an axial direction.

10. The seal assembly according to claim 1, wherein the seal housing further comprises:

an upper half seal housing;

a lower half seal housing; and a horizontal split formed between said upper and lower half seal housing.

11. A method of installing segment strips in the sealing assembly of claim 10, wherein each segment strip is slid into said groove from the horizontal split of said upper and said lower seal housing and said threaded holes of each segment strip is aligned with corresponding through holes of said grooves where fasteners and fastener retention components are threaded and torque is applied.

12. A seal assembly for a turbine engine, comprising:

a seal housing having a circumferential groove located along an edge of said seal housing, said circumferential groove having a plurality of through holes;

at least one segment strip, each having at least one threaded hole, an upstream sealing surface, a downstream sealing surface, a right circumferential sealing surface and a left circumferential sealing surface, and a plurality of fasteners for securing said at least one segment strip in said circumferential groove, wherein said circumferential groove is configured to accept the geometry of the said at least one segment strip, wherein said plurality of fasteners comprises:

a first fastener for securing and circumferentially locating said segment strip to said circumferential groove by engaging a first threaded hole of said segment strip via a first through hole of circumferential groove;

a second fastener for securing said segment strip to said circumferential groove by engaging a second threaded hole of said segment strip via a second through hole of circumferential groove, wherein said second fastener has a reduced diameter portion relative to the first fastener, which creates a larger clearance between said second fastener and said second through hole than between said first fastener and said first through hole.

13. The seal assembly of claim 12, wherein said first fastener provides additional clamping force between said seal housing and said secured segment strip relative to said second fastener, and said larger clearance between said second fastener and said second through hole allows for thermal expansion of said seal housing during operation of said turbine engine.

14. A seal assembly for a turbine engine, comprising:

a seal housing having a circumferential groove located along an edge of said seal housing, said circumferential groove having a plurality of through holes;

a plurality of segments strips, each having at least one threaded hole, an upstream sealing surface, a downstream sealing surface, a right circumferential sealing surface and a left circumferential sealing surface, and a plurality of fasteners for securing each of said plurality of segments strips in said circumferential groove in an annular manner to form a seal, wherein said circumferential groove is configured to accept the geometry of each of said plurality of secured segments strips, said upstream sealing surface of each of said plurality of secured segment strips forms an upstream contact sealing surface with said seal housing, said downstream sealing surface of each of said plurality of secured segment strips is arranged to form a downstream contact sealing surface with a stationary member of said turbine engine, said right circumferential sealing surface of a first of said plurality of secured segment strips forms a first circumferential contact sealing surface with a left circumferential sealing surface of a second of said plurality of secured segment strips, and said left circumferential sealing surface of said first of said plurality of secured segment strips forms a second circumferential contact sealing surface with a right circumferential sealing surface of a third of said plurality of secured segment strips.

15. The seal assembly according to claim 14, wherein said seal housing further comprises:

a downstream surface;

wherein said downstream sealing surface of each of said plurality of secured segment strips forms a substantially planar surface with said downstream surface of said seal housing and serves as a replaceable contact surface strip for said seal housing.

16. The seal assembly according to claim 14, wherein said seal housing further comprises:

an upstream surface;

wherein each of said plurality of through holes extend from said upstream surface to said circumferential groove.

17. The seal assembly of claim 14, wherein said first and second circumferential contact sealing surfaces are configured to prevent leakage between said first and second secured segment strips and said first and third secured segment strips, respectively.

18. The seal assembly of claim 14, wherein said first circumferential contact sealing surface includes a step portion.

19. The seal assembly of claim 14, wherein said plurality of fasteners comprises:

a plurality of first fasteners for securing and circumferentially locating each of said plurality of secured segment strips to said circumferential groove by engaging a first threaded hole of each of said plurality of secured segment strips via corresponding first through holes of said circumferential groove;

a plurality of second fasteners for securing each of said plurality of secured segment strips to said circumferential groove by engaging a second threaded hole of each of said plurality of secured segment strips via corresponding second through holes of said circumferential groove, wherein each of said plurality of second fasteners has a reduced diameter portion relative to each of said plurality of first fasteners, which creates a larger clearance between each of said plurality of second fasteners and said corresponding second through holes than between each of said plurality of first fasteners and said corresponding first through holes.

20. The seal assembly of claim 18, wherein each said plurality of first fasteners provides additional clamping force between said seal housing and each of said plurality of secured segment strips relative to each of said plurality of second fasteners, and said larger clearance between each of said plurality of second fasteners and said corresponding second through holes allows for thermal expansion of said seal housing during operation of said turbine engine.

21. The seal assembly according to claim 14, wherein said plurality of fasteners prevent unwanted relative movement and wear between said seal housing and each of said plurality of secured segment strips.

22. The seal assembly according to claim 14, further comprising:

fastener retention means for minimizing disbanding of the fasteners during turbine engine operation.

23. The seal assembly of claim 21, wherein said circumferential groove includes and a radial retention mechanism for retaining said plurality of secured segment strips in a radial direction, and an axial locating mechanism for positioning said plurality of secured segment strips in an axial direction.

24. The seal assembly according to claim 14, wherein the seal housing further comprises:

an upper half seal housing;

a lower half seal housing; and a horizontal split formed between said upper and lower half seal housing.

25. A method of installing segment strips in the sealing assembly of claim 14, wherein each of the plurality of segment strips is slid into said circumferential groove from the horizontal split of said upper and said lower seal housing and said threaded holes of each segment strip is aligned with corresponding through holes of said circumferential groove where fasteners and fastener retention components are threaded and torque is applied.

* * * * *